(12) United States Patent
Grosvenor

(10) Patent No.: US 8,180,157 B2
(45) Date of Patent: May 15, 2012

(54) IMAGE PROCESSING METHOD, IMAGE PROCESSING SYSTEM AND COMPUTER PROGRAM PRODUCT

(75) Inventor: David Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 931 days.

(21) Appl. No.: 12/184,237

(22) Filed: Jul. 31, 2008

(65) Prior Publication Data

US 2009/0034849 A1 Feb. 5, 2009

(30) Foreign Application Priority Data

Jul. 31, 2007 (GB) .................................. 0714918.0

(51) Int. Cl.
*G06K 9/48* (2006.01)
(52) U.S. Cl. ........................................ 382/199; 382/284
(58) Field of Classification Search .................. 382/100, 382/199, 284
See application file for complete search history.

(56) References Cited

U.S. PATENT DOCUMENTS

| | | | |
|---|---|---|---|
| 5,978,519 A * | 11/1999 | Bollman et al. | 382/282 |
| 7,133,571 B2 * | 11/2006 | Cheatle | 382/282 |
| 7,162,102 B2 * | 1/2007 | Cahill et al. | 382/288 |
| 7,529,390 B2 * | 5/2009 | Zhang et al. | 382/118 |
| 7,869,658 B2 * | 1/2011 | Blose et al. | 382/224 |

* cited by examiner

*Primary Examiner* — Stephen R Koziol

(57) ABSTRACT

Provided is an image processing method for cropping at least first and second images for presentation in a template, the first image having a first feature and the second image having a second feature, the template comprising a first image boundary shape and a second image boundary shape, the method comprising:
determining the location of the first feature in the first image and the second feature in the second image;
calculating a constraint on the locations of the first image boundary shape on the first image and the second image boundary shape on the second image, the constraint based on an alignment criterion specifying the alignment of the first feature in the first image and the second feature in the second image when the first and second images are presented in the template;
generating a cropped image combination by placing the first image boundary shape on the first image and the second image boundary shape on the second image according to the constraint.

20 Claims, 7 Drawing Sheets

IMAGE PROCESSING METHOD, IMAGE PROCESSING SYSTEM AND COMPUTER PROGRAM PRODUCT

RELATED APPLICATIONS

The present application is based on, and claims priority from, United Kingdom Application Number 0714918.0, filed Jul. 31, 2007, the disclosure of which is hereby incorporated by reference herein in its entirety.

FIELD OF THE INVENTION

The invention relates generally to the field of digital image processing, and more particularly to the cropping of digital images.

BACKGROUND OF THE INVENTION

Cropping is the process of the removal of outer parts of an image. Cropping may take place to improve the composition of an image, or to change the aspect ratio of the image. Manually cropping digital images can be a time consuming process, therefore computer implemented automatic cropping techniques have been developed for digital images.

U.S. Pat. No. 6,654,506 discloses a method and computer system for cropping a digital image. The method includes inputting a belief map of a photographic image where the belief map includes belief values for locations in the image indicating the importance of a photographic subject at that location in the image. The method further comprises selecting a zoom factor and a crop window, clustering regions of the belief map to identify background portions, secondary portions, and main portions. The method further comprises positioning the crop window such that the crop window is centered around a main portion having a highest belief value, and moving the crop window such that the crop window is included completely within the image, and moving the crop window such that a sum of belief values is at a maximum. The image is cropped according to the crop window.

US 2002/0191861 discloses an apparatus and method relating to the automatic and semi-automatic cropping of electrical images. An electronic image processing device for cropping an electronic image comprises an image processing means which includes an electronic processor, and firmware, and/or software for processing the electronic image. The device processes the electronic image to identify one or more features relevant to the composition of the electronic image, each such feature having one or more compositionally significant properties from amongst a plurality of different predetermined compositional properties, and each such feature occupying a sub-region of the electronic image. Then the device selects one or more compositional rules from a set of predetermined compositional rules, based on the relevance of the compositional rules to the compositionally significant properties of one or more of the identified features. Then the device determines one or more suitable crop boundaries by applying one or more of the selected compositional rules.

SUMMARY OF THE INVENTION

According to an embodiment of the invention there is provided a method for cropping at least first and second images for presentation in a template. The first image has a first feature and the second image has a second feature. The template comprises a first image boundary shape and a second image boundary shape. The method comprises determining the location of the first feature in the first image and the location of the second feature in the second image. The method further comprises calculating a constraint on the locations of the first image boundary shape on the first image and the second image boundary shape on the second image. The constraint is based on an alignment criterion specifying the alignment of the first feature in the first image and the second feature in the second image when the first and second images are presented in the template. The method further comprises generating a cropped image combination by placing the first image boundary shape on the first image and the second image boundary shape on the second image according to the constraint.

BRIEF DESCRIPTION OF THE DRAWINGS

In the following, embodiments of the invention will be described, by way of example only and with reference to the drawings in which.

DETAILED DESCRIPTION

Figure 1:
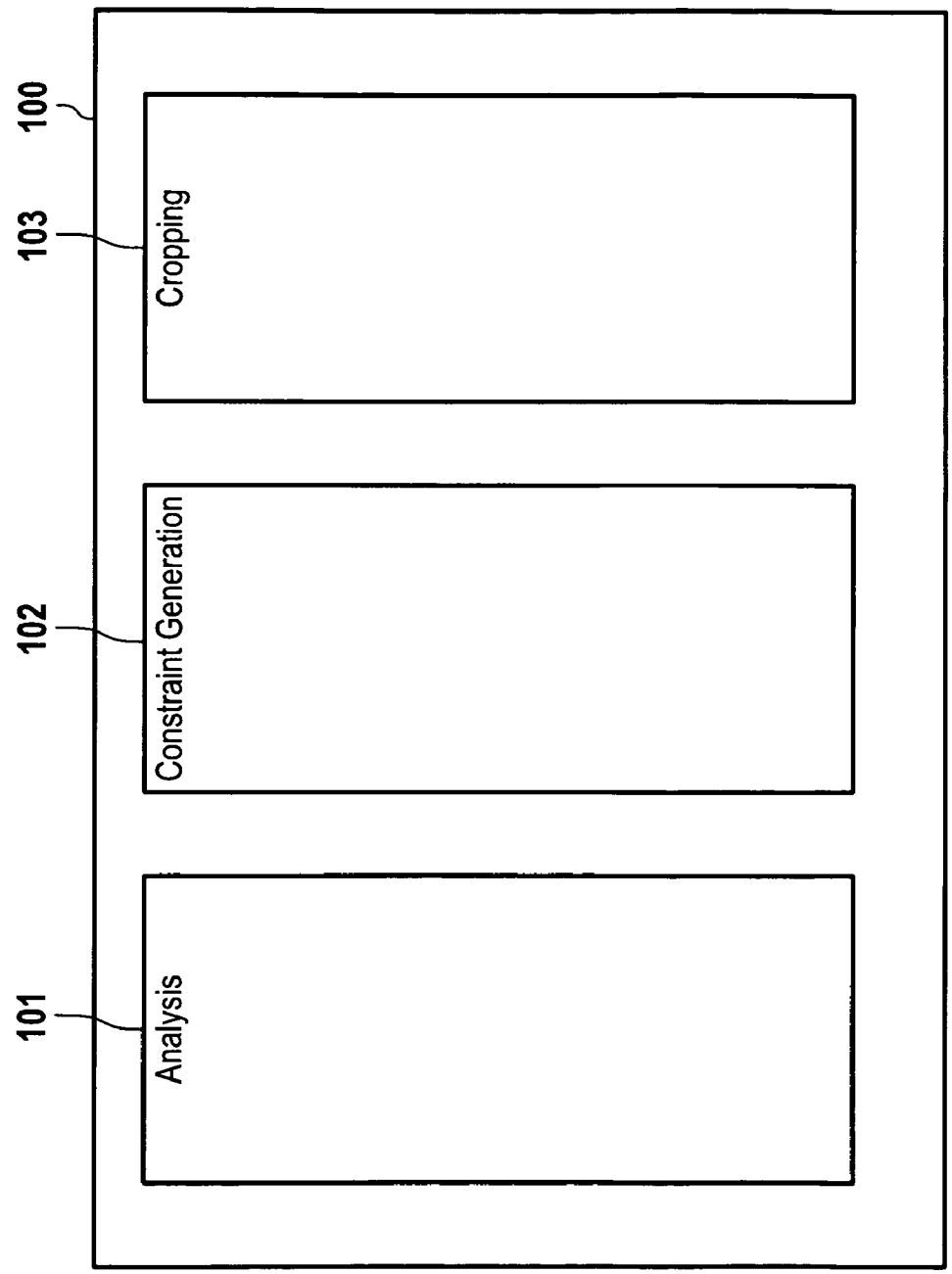
FIG. 1 is a block diagram of an image processing system.

FIG. 1 shows a block diagram of an image processing system 100. The image processing system 100 comprises an analysis component 101 for analyzing two or more images and identifying features to be aligned. The identified features may be linear features such as horizon lines, beach lines, or building lines. Features may also be non-linear features such as people, or the faces of people. The image processing system 100 further comprises constraint generation component 102 for calculating a constraint on the locations of a cropping shape on the images so that the features are aligned according to an alignment criterion. The alignment criterion may be for example, that the horizons in the two images are aligned. The image processing system 100 further comprises cropping component 103. Cropping component 103 is operable to produce pairs of crops which match the alignment criterion. Cropping component 103 may comprise an automated cropping algorithm known in the art such as those discussed in the background section. The technique of cropping involves selecting the position of a cropping shape on the original image and discarding the section of the image outside the cropping shape. Thus, for a given cropping shape, the variables are the location of the shape within the original image, and a zoom factor determined by the size of the cropping shape. The constraint generated by the constraint generation component 102 limits possible combinations of cropped images such that when presented in a template the features identified by the analysis component 101 are aligned.

Figure 2:
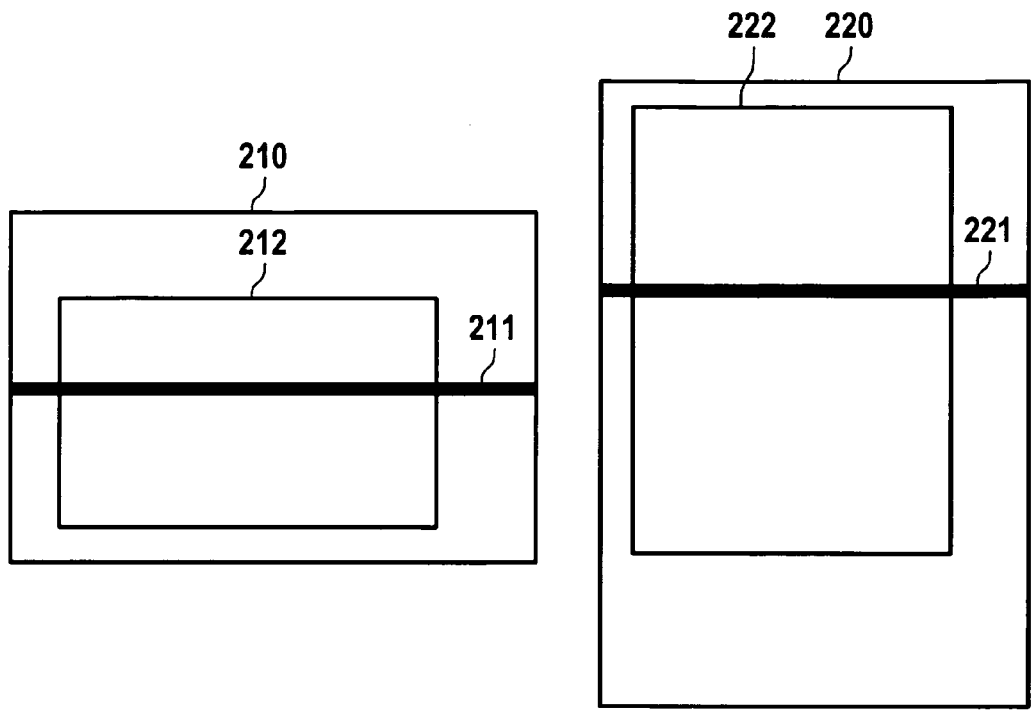
FIG. 2 illustrates two original images.
Figure 3:
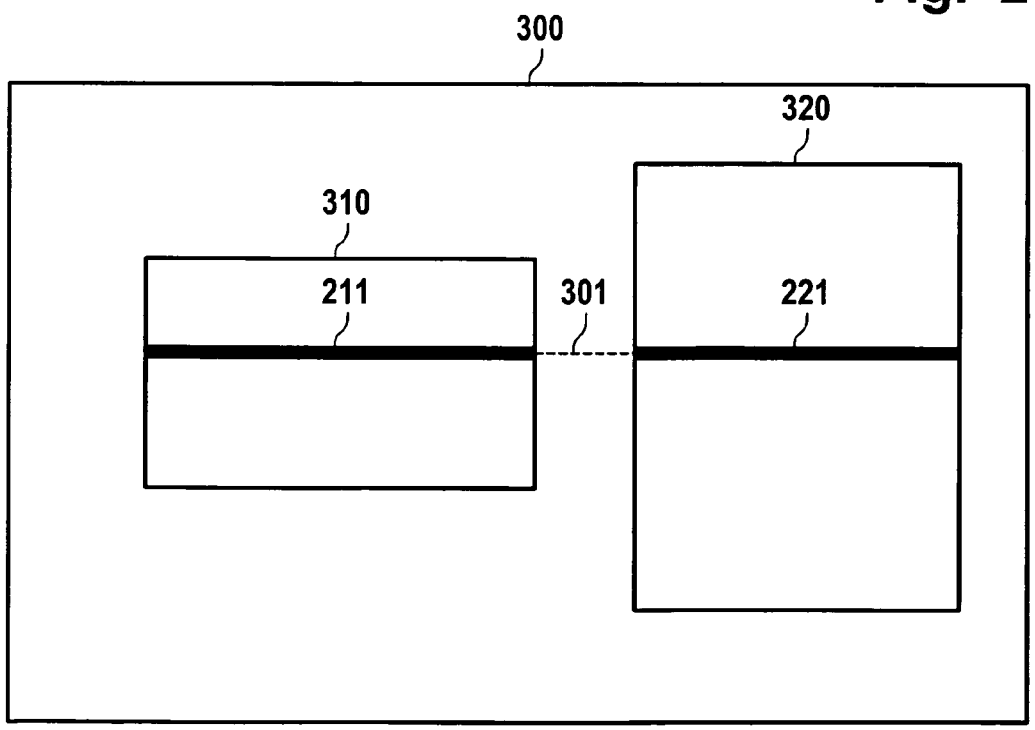
FIG. 3 illustrates cropped images presented in a template.

The examples in FIG. 2 and FIG. 3 show how the system 100 may be used to obtain aligned cropped images.

FIG. 2 shows original images 210 and 220 which have features 211, and 221 respectively. Features 211 and 221 may be for example horizon lines, beach lines, or building lines. Although features 211 and 221 are shown as horizontal linear features, they may be non-linear features such as people, or they may be non-horizontal linear features such as building lines. FIG. 2 shows image 210 being cropped by cropping rectangle 212. Image 220 is cropped by cropping rectangle 222.

FIG. 3 shows cropped images from cropping rectangles 212 and 222 presented in template 300. Template 300 has image boundary shape 310 in which the image derived by cropping image 210 is presented. Template 300 also has second image boundary shape 320 in which the image derived by cropping image 220 is presented. The images are presented subject to the constraint that features 211 and 221 are aligned as indicated by alignment constraint 301. The alignment constraint shown by dotted line 301 may be a gridline included in template 300, or may be a constraint that features 211 and 221 are aligned with each other, but the location of this alignment may not be fixed.

Figure 4:
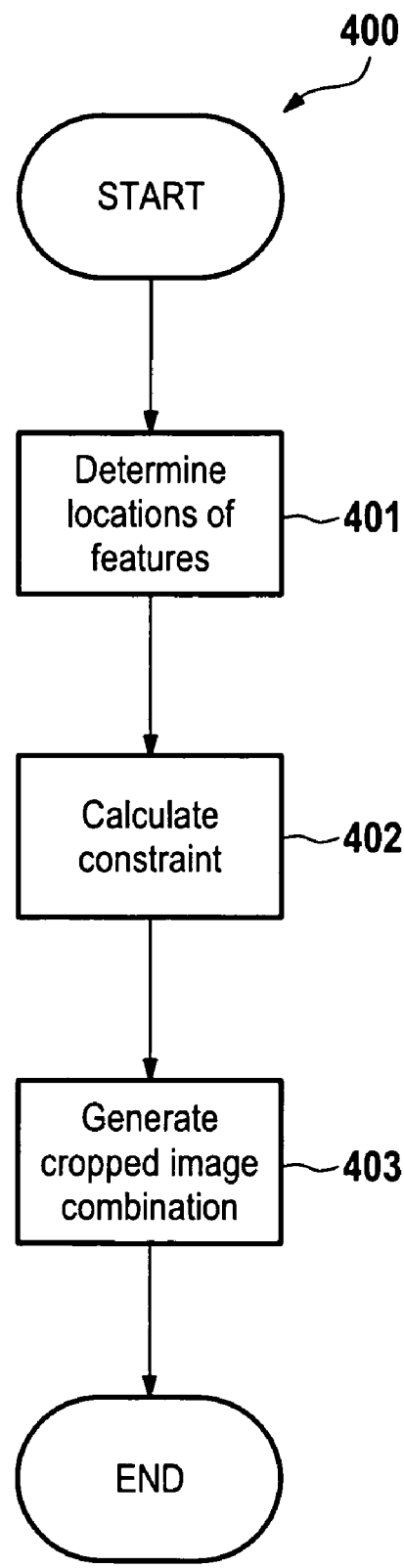
FIG. 4 is a flow diagram illustrating the steps involved in a method for cropping images for presentation in a template.

FIG. 4 shows a flow diagram illustrating a method 400 for cropping images for presentation in a template such that features of the images are aligned. The method may be used with the system shown in FIG. 1 to obtain alignment such as that shown in FIG. 2 and FIG. 3. In step 401 the locations of features to be aligned are determined. This may include the use of a pattern recognition algorithm to determine the location of linear features such as horizons, water lines, beach lines, or building lines. Determination of the location of features to be aligned in step 104 may include the use of a face recognition algorithm to determine the location of people's faces in the images. In step 402 a constraint is calculated. This constraint is based on the locations of features determined in step 401, and the template in which the images will be presented such as that shown as 300 in FIG. 3. In step 403, cropped image combinations are generated using the constraint.

The method of FIG. 4 and the system of FIG. 1 may be used to obtain the alignments of images described in FIGS. 5, 6, 7 and 8 below. The method of FIG. 4 may further comprise the step of determining the aspect ratio or shape of the image boundary shapes in the template. The templates may have be flexible with regard to aspect ratio and may be used to layout images with arbitrary aspect ratios. The aspect ratio or cropping shape may be determined from the image content.

Figure 5:
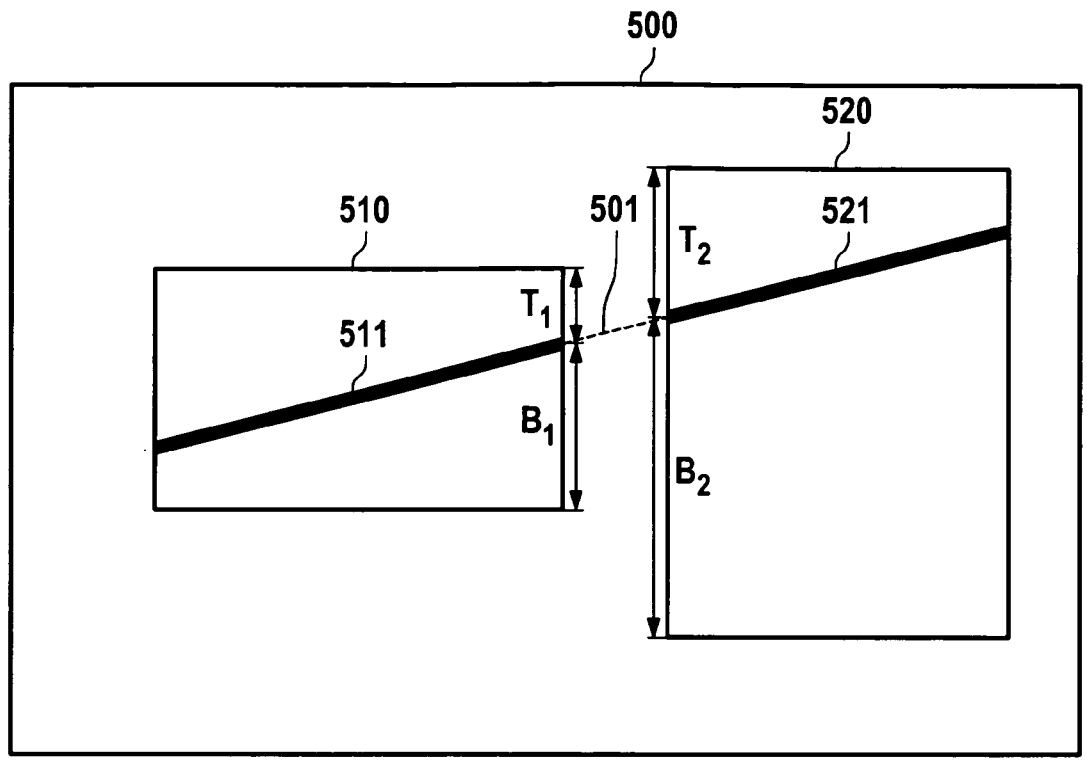
FIG. 5 illustrates the ratios used in the calculation of an alignment constraint.

FIG. 5 shows the alignment of linear features 511, and 521 of images 510 and 520 respectively, when placed in template 500 subject to alignment constraint 501. The alignment constraint 501 may be a feature of template 500, or may be the constraint that features 511 and 521 are aligned without specifying their respective locations within template 500. Images 510 and 520 are obtained by cropping two original images. The purpose of the cropping is to ensure that linear features 511 and 521 are aligned according to alignment constraint 501. At the right hand side of cropped image 510, the distance between linear feature 511 and the top of the frame is T1, and the distance between linear feature 511 and the bottom of the frame is B1. Similarly at the left hand side of frame 520, the distance between linear feature 521 and the top of the frame is T2 and the distance between linear feature 521 and the bottom of the frame is B2. In order to ensure alignment of linear features 511 and 521 according to alignment constraint 501, the relationship between the ratio T1 to B1 and the ratio T2 to B2 is fixed by the relative positions of the cropped images in the template 500 and the alignment constraint 501. Thus in order to generate cropped image combinations the constraint upon the ratios described above can be used to narrow the search space in which the cropping shapes can be placed on the original images used to generate cropped images 510 and 520.

Figure 6:
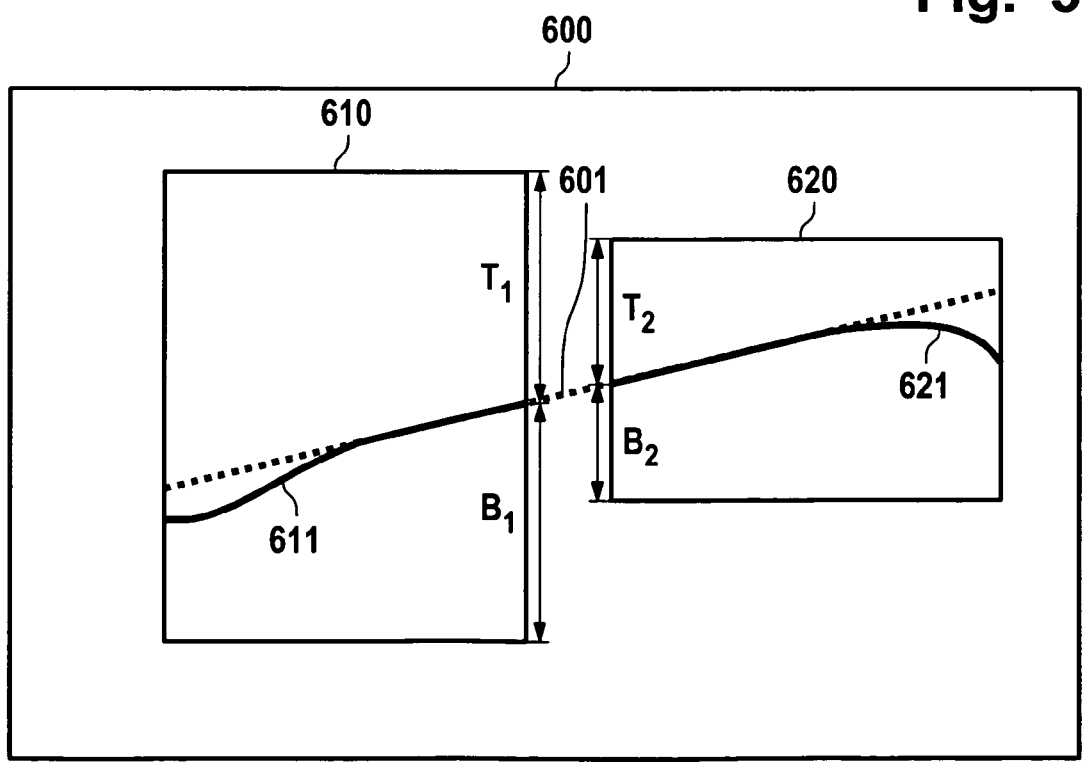
FIG. 6 illustrates the alignment of images according to partially linear features.

FIG. 6 shows the case of aligning a pair of locally linear features 611 and 621 in template 600 having template slots 610 and 620. Features 611 and 621 may for example be the outlines of hills in photographs. The features 611 and 621 are aligned with each other using line 601. Line 601 may be a fixed line in the template 600, or alternatively line 601 may be allowed to move within the page. The ratios T1 to B1 and T2 to B2 may be used when generating crops to fit windows 610 and 620 respectively.

Figure 7:
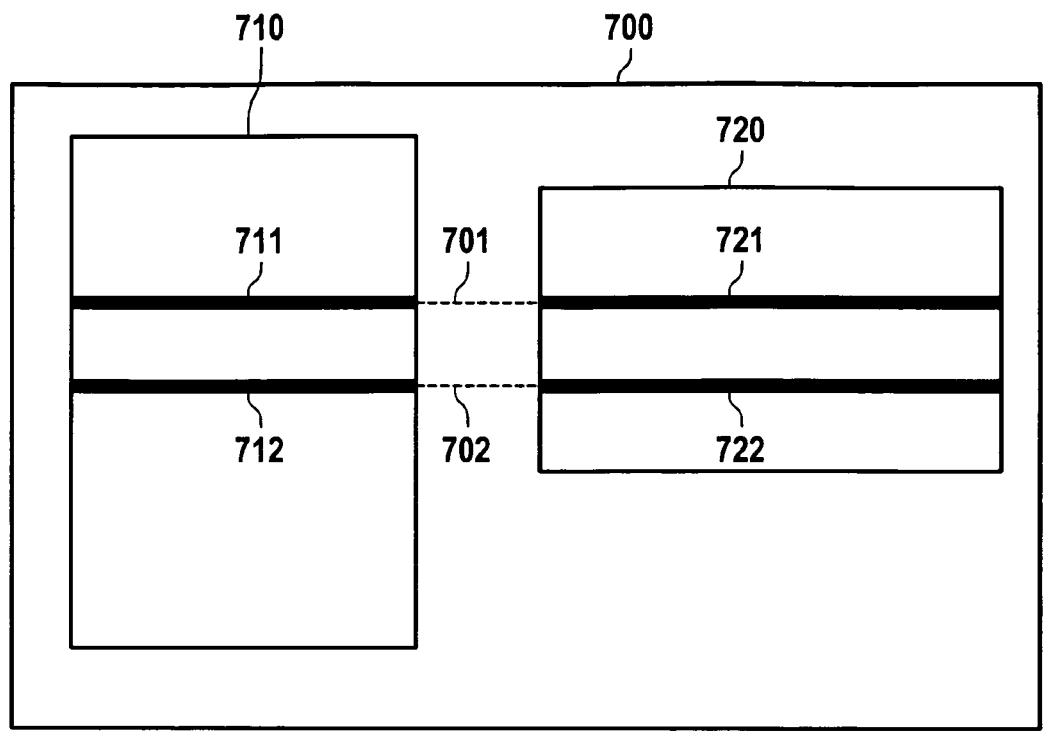
FIG. 7 illustrates the alignment of two linear features.

FIG. 7 shows a template 700 in which images are aligned within image shapes 710 and 720. The image which is cropped to fit into template slot 710 has linear features 711 and 712. The image which is cropped to fit into template window 720 has linear features 721 and 722. The cropping takes place such that linear feature 711 is aligned with linear feature 721 by line 701. Additionally linear feature 712 is aligned with linear feature 722 by line 702. Lines 701 and 702 may be fixed on the template 700. In such a case, the scaling of images to fit in windows 710 and 720 is fixed by the distance between linear features thus one conducting a search for crops to fit in windows 710 and 720 the only variable is to move the cropping windows horizontally as vertical movement and scaling are both fixed. Alternatively lines 701 and 702 may not be fixed by the template in such a case that scaling of images to fit in template windows 710 and 720 would be fixed relative to each other. Additionally the cropping window could be moved horizontally within the images without affecting the alignment.

Figure 8:
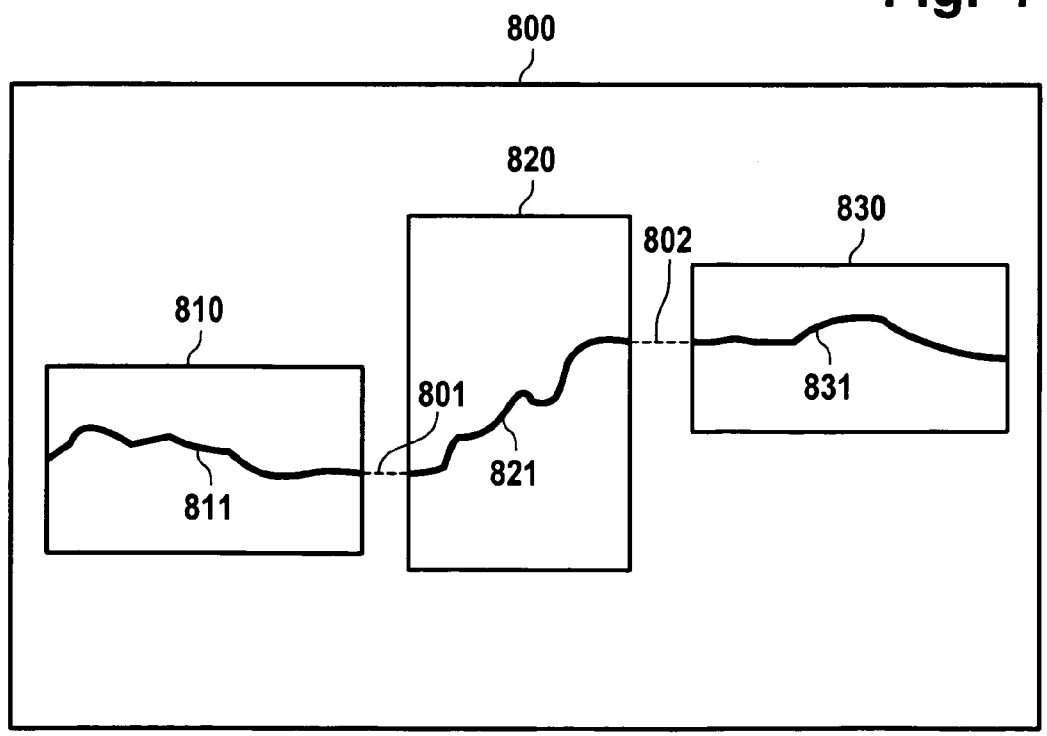
FIG. 8 illustrates the alignment of features in three images.

FIG. 8 shows the alignment of three cropped images 810, 820 and 830 within template 800. In the situation shown in FIG. 8, the linear feature 821 in image slot 820 is aligned with both line 801 and line 802 thus in the case that lines 801 and 802 are fixed on the page, the scale of the image displayed in slot 820 is fixed by the locations of the feature 821 at the left and right hand sides of the image slot 820. The images displayed in slots 810 and 830 are only aligned with one line and therefore the scale of the images can be changed as well as the horizontal position of the crop window. As before the lines 801 and 802 may not be fixed relative to template 800 in such a case the scaling of the image displayed in window 820 could be changed. This would however affect the locations of images 811 in slot 810 and 831 in slot 830.

Generally more than two arbitrary linear features cannot be aligned. However it may be the case that photographs or images can be cropped such that more features will be aligned. In the general case however a maximum of two linear features for use in aligning images must be chosen. It may be possible to iterate of the set of possible features for alignment and then to choose features having created a number of sets of aligned images based on another criteria such as an aesthetic criteria like the emphasis given to people in an image, or a particular target scale of the images. Additionally some alignments may be more aesthetically pleasing than others, for example aligning a white line with a black edge may not be convincing. Therefore a control may be included within the analysis component that selects particular features for alignment with relevant features in another image.

When images are aligned using a single feature, the zoom factor or scale of the relative images selected determined by the size of the crop window is not constrained by the alignment constraint. Relative sizes of the crop windows may however be constrained by an additional constraint that features in the images are presented at the same size or at the same scale. When creating the temporary illusion of images presented on a page forming a single scene, it is less important to exactly align people and objects than it is to align linear features, but it is more important to present people at the same scale. This is because people and objects naturally occur unaligned in scenes whereas horizons and other scene boundaries such as building edges, beach lines, and sea shores tend to be continuous.

In order to fix the relative scale of images presented together, the relative scale of objects and people must be determined. This may be achieved using meta-data identifying a person or indicating clusters of people. Such meta-data may be inferred from a photo collection. If a particular person is present in a number of different photographs then differences in size can be attributed to variation in depth. If different people are present in the same photograph then relative sizes can be determined. This requires the people to occur within the same depth band of the scene. The depth band may be identified using segmentation, or using a depth from defocusing approach. Further if a person is recognised in a photograph then the size of the person in the image indicates the depth.

The linear features that are aligned may be discontinuous. This may be due to for example object occluding the linear features. An additional constraint that discontinuities are not placed near to the frame edge may be included in the search for potential alignments.

In addition to linear features, objects and people may be aligned in the images presented in a template. This may be done in a similar method to that described above for linear features however taking the position of a person or object instead of the linear feature.

Objects or linear features in an image may be aligned with the gaze direction of a person in one of the images. This creates the impression that the person is looking at the object or along the linear feature.

In addition to ensuring alignment of features, the number of potential positions for a crop window may be reduced by the constraint that certain features must be unaligned, or in fact excluded from the crop window. This can be performed for example by manipulating an importance map used by the auto-cropping to encourage crops which do not contain the linear features. This requires the auto-cropping to conduct a full search for the cropping region although a heuristic using the location of the linear features can be used to limit the size of the cropping region considered.

Figure 9:
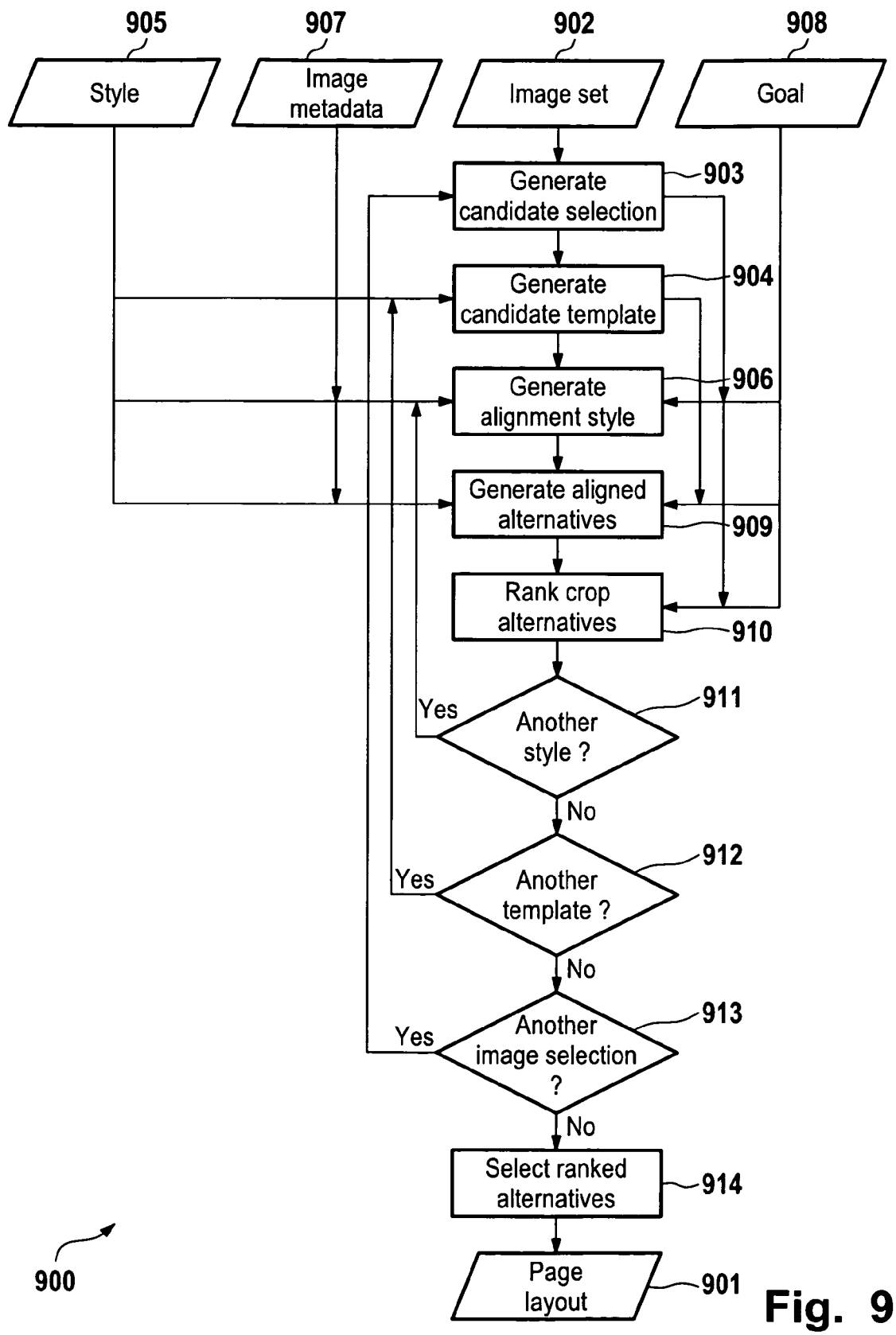
FIG. 9 is a flow diagram illustrating the steps involved in the generation of a page layout.

FIG. 9 shows a method 900 for generating a page layout 901 from an image set 902. The method may be executed on a system such as that shown in FIG. 1 to obtain the alignment of images described above. In step 903 a candidate image selection is generated. In step 904 a candidate template is generated. This may involve using a style signal 905. In step 906 an alignment style is generated. This may involve using image meta-data 907. Goal signal 908 may also be used in the generation of an alignment style. In step 909 aligned alternatives are generated. This involves placing a crop window at different locations and varying the size of the crop window according to the alignment style generated in step 906. In step 910, the crop alternatives are ranked. This may be according to an aesthetic criterion such as the presence of images containing similar colours on the same page or alignment with a grid. The ranking may also be based on an attribute specified by the goal signal such as the emphasis given to at least one person. In step 911 a determination as to whether another style should be generated is made. In step 912 a determination as to whether another template should be generated is made. In step 913 a determination as to whether another image selection should be used is made. In step 914 one of the ranked alternatives is selected. The selected ranked alternative is then output as the page layout 910.

Step 904 in which a candidate template is generated may involve determining the aspect ratio of the template slot. The aspect ratio may be determined from the image content.

Figure 10:
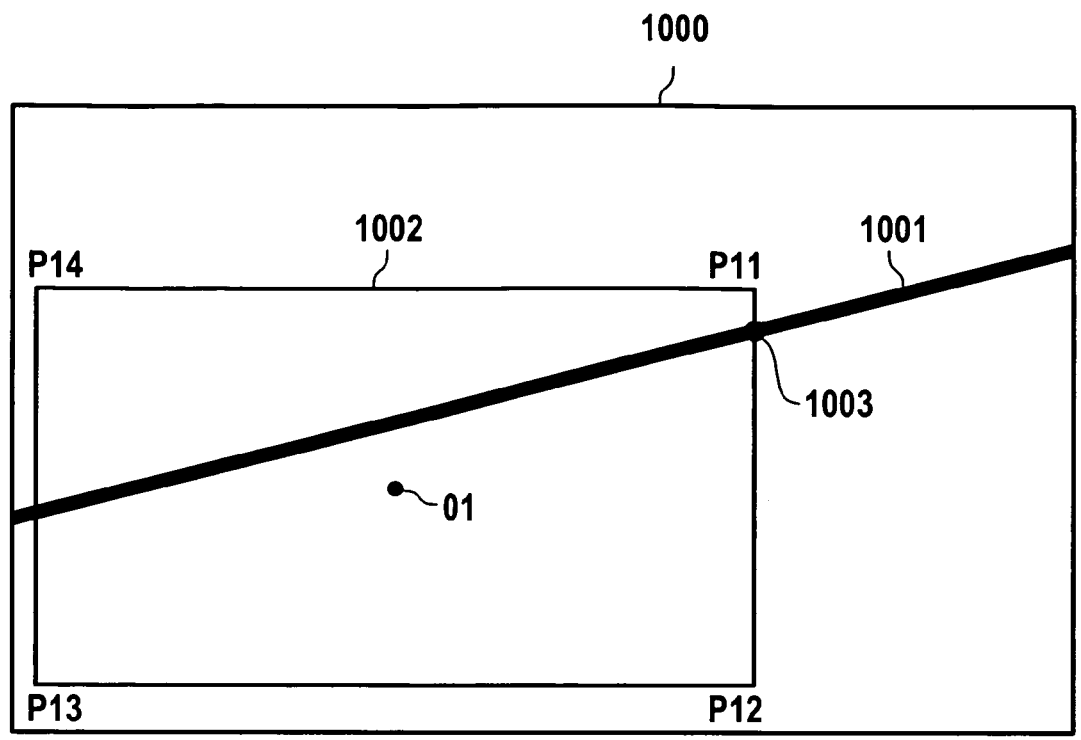
FIG. 10 illustrates the placement of a crop rectangle on a first image.
Figure 11:
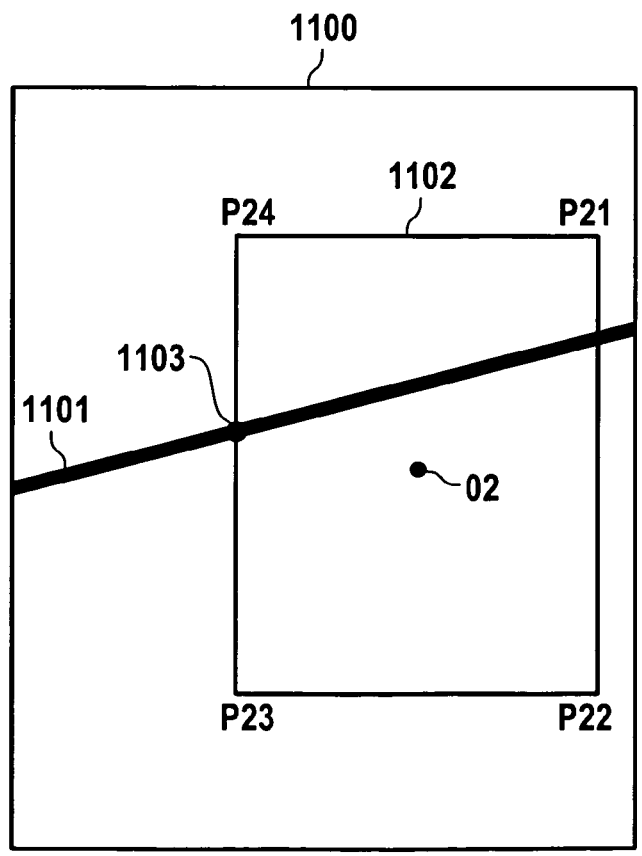
FIG. 11 illustrates the placement of a crop rectangle on a second image.

FIGS. 10 and 11 show how the alignment constraint may be generated by Constraint generation component 102 of image processing system 100 shown in FIG. 1. This may correspond to step 402 of method 400.

FIG. 10 illustrates the placement of a crop rectangle 1002 on a first image 1000. The intersection of the feature 1001 with the right hand edge of crop rectangle 1002 occurs at the point 1003. Crop rectangle 1002 has origin O1, and corner points P11, P12, P13 and P14. The aspect ratio (which will be denoted R1) of crop rectangle 1002 is fixed by the template and the width, or scale (denoted S1) may be changed as the scale of the crop is not fixed. Thus there are three variables in the placement of the crop rectangle, the two coordinates of the origin O1 and the scale S1. These are determined subject to the constraint that the four corners P11, P12, P13 and P14 lie within the image 1000

The corner points of the cropping rectangle may be written in terms of the origin O1, the width, or scale S1 and the aspect ratio R1 as follows:

$$P11 = O1 + \left(\frac{S1}{2}, \frac{-S1*R1}{2}\right)$$

$$P12 = O1 + \left(\frac{S1}{2}, \frac{S1*R1}{2}\right)$$

$$P13 = O1 + \left(-\frac{S1}{2}, \frac{S1*R1}{2}\right)$$

$$P14 = O1 + \left(-\frac{S1}{2}, -\frac{S1*R1}{2}\right)$$

Where the height of cropping rectangle has been taken as S1R1.

In the case currently being considered, the cropped image from crop rectangle 1002 will be placed in the left hand template slot, therefore the intersection of linear feature 1001 with the right hand side of crop rectangle 1002 must be considered. The intersection of linear feature 1001 and the side of crop window 1002 running from P11 to P12, occurs at the point 1003. The crop rectangle is place to obtain desired ratio T1:B1 between the distances to the top and the bottom of the crop window.

An equation for the line $F_1$ formed by the feature 1001 with a gradient vector $v_1$ in terms of parameter $t'_1$ which goes through the point $q_1$ for $t'_1=0$ may be written $$F_1 = v_1 \cdot t'_1 + q_1$$

The line of the right-hand edge of the cropping rectangle $L^1_{12}$ is formed by the line from the corner point P11 to P12

$$L^1_{12} = (1-t)*P11 + t*P12$$
$$= P11 + t*(P12 - P11)$$
$$= P11 + t*(0, S1*R1)$$

Note this line gives the distance from a point with a parameter t to the top edge as t*S1*R1 and the distance to the bottom edge as ((1−t)*S1*R1).

For a given crop rectangle S1 and O1 can be fixed and the intersection of the right hand edge P11 to P12 and the linear feature 1001 determined by solving the two equations in the two unknowns to obtain t=t#. This has an algebraic solution providing the two lines are not parallel. Solutions not within the original image (0<t#<1) need to be removed.

Assuming we have a valid solution for t# we can derive a expression for the target ratio $$T1/B1 = t\#/(1-t\#)$$

Thus the alignment constraint can be used to obtain one equation in terms of three unknowns S1 and O2. This is an under-determined system of equations and gives a parametric family of solutions with two degrees of freedom which geometrically allow the potential cropping rectangles to be versions with different scales and translated along the path of the linear feature. Furthermore these solutions are constrained by the need for the point of intersection and the cropping rectangle to be within the original photo.

Thus aligning linear features to a fixed line constrains/reduces the possible crops that can be taken from the original photo. Since auto-cropping is based upon a search/optimization of the cropping rectangle over an importance map the alignment constraint can be used to reduce the search space and speed-up the auto-cropping.

Standard mathematical techniques can be used for solving under-determined systems of equations subjected to sets of constraints to directly obtain a parametric form for the family of solutions. Such systems can be solved under box constraints for example by using the techniques discussed in J. B. Francisco, N. Krejic, J. M. Martinez, 'An interior-point method for solving box-constrained underdetermined nonlinear systems', Journal of Computational and Applied Mathematics 117 (2005) 67-88.

A heuristic based approach which both exploits the constraints described above can be used, and combined with the auto-cropping search which would exploits the parametric solution. The approach may be as follows: search through a range of scales, starting with the largest sized cropping rectangle first and reducing the scale, perform a spatial search (such as a spiral outwards) from the center of the original photo to find an initial position for the cropping-rectangle both aligning the feature and within the original photo, perform a search along the direction of the linear feature to find the cropping rectangle which optimizes the importance of the enclose content. A set of aligned-crops for each scale could be returned together with their importance for late ranking.

This obtains faster auto-cropping as well as obtaining the aligned content which is aesthetically pleasing.

Each template-slot being aligned to the line would generate a set of aligned-crops by solving a similar set of constraints.

FIG. 11 illustrates the placement of a crop rectangle 1102 on a second image 1100. It is now the intersection of the feature 1101 with the left hand edge of crop rectangle 1102 which is considered and this occurs at the point 1103. Crop rectangle 1102 has origin O1, and corner points P21, P22, P23 and P24. The aspect ratio (which will be denoted R2) of crop rectangle 1102 is fixed by the template and the width, or scale S2 may be changed as the scale of the crop is not fixed. Thus there are three variables in the placement of the crop rectangle, the two coordinates of the origin O2 and the scale S2. These are determined subject to the constraint that the four corners P21, P22, P23 and P24 lie within the second image 1100

Following the analysis for FIG. 10 above, the corner points of the cropping rectangle may be written in terms of the origin O2, the width, or scale S2 and the aspect ratio R2 as follows:

$$P21 = O2 + \left(\frac{S2}{2}, \frac{-S2 * R2}{2}\right)$$

$$P22 = O2 + \left(\frac{S2}{2}, \frac{S1 * R2}{2}\right)$$

$$P23 = O2 + \left(-\frac{S2}{2}, \frac{S2 * R2}{2}\right)$$

$$P24 = O2 + \left(-\frac{S2}{2}, -\frac{S2 * R2}{2}\right)$$

Where the height of cropping rectangle has been taken as S2R2.

Similar analysis may be performed on this case and a similar search performed to find a set of aligned crops for a range of scales. This search of the second photo is performed independently of the search of the first photo, although they are both being aligned along the same line of the page.

The method extends to aligning more than two photos to the page-line. But this places a stricter linearity constraint on the linear features near both edges which both need to be alignment with the same page-line, and need both the same gradient to simultaneously coincide with the same line at the frame-edges. For example, in FIG. 6 the neither of the two template-slots meet this requirement; in the left template-slot the outline of the hills on the left and right frame-edges (whilst approximately having the same gradient) cannot be both made coincident with the same line; in the right template-slot the right edge of the outline of the hills has a completely different gradient to the left-edge hill-outline. The aligning of more than two photos to a single page-line becomes increasingly more restrictive and effectively requires the features aligned to be strong linear features rather than locally-linear features such as the outline of the hills.

The target ratio T2:B2 can be calculated from the ratio T1:B1 of the first image, the relative positions of the cropped images in the template and the gradient of the feature. Thus, in the case where there the alignment is not fixed by a target gridline on the template, the search heuristic may search over a range of possible intersects and performs a search for the first and second images for each of the calculated ratios.

| List of Reference Numerals | |
|---|---|
| 100 | Image processing system |
| 101 | Analysis component |
| 102 | Constraint generation component |
| 103 | Cropping component |
| 210 | Image |
| 211 | Feature |
| 212 | Cropping rectangle |
| 220 | Image |
| 221 | Feature |
| 222 | Cropping rectangle |
| 300 | Template |
| 301 | Alignment constraint |
| 310 | Image boundary shape |
| 320 | Image boundary shape |
| 400 | Method |
| 401 | Determine locations of features |
| 402 | Calculate constraint |
| 403 | Generate cropped image combination |
| 500 | Template |
| 501 | Alignment constraint |
| 510 | Image |
| 511 | Linear feature |
| 520 | Image |
| 521 | Linear feature |

-continued

List of Reference Numerals

| | |
|---|---|
| 600 | Template |
| 601 | Alignment constraint |
| 610 | Template slot |
| 611 | Feature |
| 620 | Template slot |
| 621 | Feature |
| 700 | Template |
| 701 | Alignment constraint |
| 702 | Alignment constraint |
| 710 | Template slot |
| 711 | Feature |
| 712 | Feature |
| 720 | Template slot |
| 721 | Feature |
| 722 | Feature |
| 800 | Template |
| 801 | Alignment constraint |
| 802 | Alignment constraint |
| 810 | Template slot |
| 811 | Feature |
| 820 | Template slot |
| 821 | Feature |
| 830 | Template slot |
| 831 | Feature |
| 900 | Method |
| 901 | Page layout |
| 902 | Image set |
| 903 | Generate candidate selection |
| 904 | Generate candidate template |
| 905 | Style |
| 906 | Generate alignment style |
| 907 | Image metadata |
| 908 | Goal |
| 909 | Generate aligned alternatives |
| 910 | Rank crop alternatives |
| 911 | Another style? |
| 912 | Another template? |
| 913 | Another image selection? |
| 914 | Select ranked alternatives |
| 1000 | First image |
| 1001 | Linear feature |
| 1002 | Crop rectangle |
| 1003 | Intersect point |
| P11 | Corner of crop rectangle |
| P12 | Corner of crop rectangle |
| P13 | Corner of crop rectangle |
| P14 | Corner of crop rectangle |
| O1 | Origin of crop rectangle |
| 1100 | Second image |
| 1101 | Linear feature |
| 1102 | Crop rectangle |
| 1103 | Intersect point |
| P21 | Corner of crop rectangle |
| P22 | Corner of crop rectangle |
| P23 | Corner of crop rectangle |
| P24 | Corner of crop rectangle |
| O2 | Origin of crop rectangle |

The invention claimed is:

1. An image processing method for cropping at least first and second images for presentation in a template, the first image having a first feature and the second image having a second feature, the template comprising a first image boundary shape and a second image boundary shape, the method comprising:

determining the location of the first feature in the first image and the second feature in the second image;

calculating a constraint on the locations of the first image boundary shape on the first image and the second image boundary shape on the second image, the constraint based on an alignment criterion specifying the alignment of the first feature in the first image and the second feature in the second image when the first and second images are presented in the template;

generating a cropped image combination by placing the first image boundary shape on the first image and the second image boundary shape on the second image according to the constraint.

2. The image processing method of claim 1, wherein the cropped image combination is generated using saliency maps for the first and second images.

3. The image processing method of claim 1, the first and second features being the same linear feature shown in the first and second images.

4. The image processing method of claim 1, the first and second image boundary shapes being rectangles.

5. The image processing method of claim 4, the constraint being a target ratio of the distances between a linear feature and the top and the bottom of the image boundary shapes.

6. The image processing method of claim 1, the template further comprising a grid line and the alignment criterion being that the first features of the first and second images are located on the grid line.

7. The image processing method of claim 1, further comprising the step of determining the sizes of the first and second features in the first and second images and the constraint further specifying that the first and second features are presented at the same scale.

8. The image processing method of claim 1, the first image further comprising a third feature and the second image further comprising a fourth feature and the constraint further specifying the alignment of the third and fourth features when the first and second images are presented in the template.

9. The image processing method of claim 1, the first image having a fifth feature the constraint further specifying that the fifth feature be outside the first image shape.

10. The image processing method of claim 1, further comprising the step of determining a measure of an attribute specified by a goal signal.

11. The image processing method of claim 1 further comprising the step of determining the first and second image boundary shapes from the image content.

12. The image processing method of claim 4 further comprising the step of determining the aspect ratios of the first and second image boundary shapes from the image content.

13. An image processing system comprising:

an analysis component, operable to determine the locations of a first feature in first a first image and a second feature in a second image;

a constraint generation component operable to generate a constraint on the positioning of first and second image boundary shapes on the first and second images, the constraint based on an alignment criterion specifying the alignment of the locations of the first and second features when the first and second images are presented in a template for displaying images on a page in the first and second image boundary shapes;

a cropping component operable to generate crops of the images using the image shapes subject to the constraint.

14. The image processing system of claim 13, the cropping component further operable to use a saliency map to generate crops.

15. The image processing system of claim 13, the image analysis component being operable to select the first and second features.

16. The image processing system of claim 13, the cropping component further operable to change the size of the first and second image boundary shapes.

17. The image processing system of claim 16, the image analysis component further operable to determine the locations of a third image feature in the first image and a fourth image feature in the second image and the constraint generation component further operable to include in the constraint that the third and fourth image features are located according to the alignment criterion.

18. A non-transitory computer program product comprising computer executable instructions which when executed perform an image processing method for cropping at least first and second images for presentation in a template, the first image having a first feature and the second image having a second feature, the template comprising a first image boundary shape and a second image boundary shape, the method comprising the steps of:

determining the location of the first feature in the first image and the second feature in the second image;

calculating a constraint on the locations of the first image boundary shape on the first image and the second image boundary shape on the second image, the constraint based on an alignment criterion specifying the alignment of the first feature in the first image and the second feature in the second image when the first and second images are presented in the template;

generating a set of cropped image combinations, each cropped image combination generated by placing the first image boundary shape on the first image and the second image boundary shape on the second image according to the constraint.

19. The non-transitory computer program product of claim 18, the method further comprising the step of ranking the set of cropped images according to attribute specified by a goal signal.

20. The non-transitory computer program product of claim 19, the attribute specified by the goal signal being the emphasis given to at least one person.

\* \* \* \* \*

UNITED STATES PATENT AND TRADEMARK OFFICE
CERTIFICATE OF CORRECTION

| | | |
|---|---|---|
| PATENT NO. | : 8,180,157 B2 | Page 1 of 1 |
| APPLICATION NO. | : 12/184237 | |
| DATED | : May 15, 2012 | |
| INVENTOR(S) | : David Grosvenor | |

It is certified that error appears in the above-identified patent and that said Letters Patent is hereby corrected as shown below:

In column 10, line 44, in Claim 13, delete "first a" and insert -- a --, therefor.

Signed and Sealed this
First Day of January, 2013

David J. Kappos
*Director of the United States Patent and Trademark Office*